(12) United States Patent
Ngo-Tan et al.

(10) Patent No.: US 10,164,893 B2
(45) Date of Patent: Dec. 25, 2018

(54) DATA TRANSFER APPARATUS, DATA TRANSFER CONTROLLING METHOD AND DATA STREAM

(71) Applicant: Samsung Electronics Co., Ltd., Suwon-si, Gyeonggi-do (KR)

(72) Inventors: Johanna Joyce Ngo-Tan, Taguig (PH); Reynaldo Roseos Tugade, Jr., Taguig (PH); Timothy Israel Dilag Santos, Taguig (PH); Do-Young Joung, Seoul (KR); Jeong-Seok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 15/240,558

(22) Filed: Aug. 18, 2016

(65) Prior Publication Data

US 2017/0054648 A1   Feb. 23, 2017

(30) Foreign Application Priority Data

Aug. 19, 2015  (PH) .............................. 1-2015-000269
Mar. 31, 2016  (KR) ........................ 10-2016-0039034

(51) Int. Cl.
*H04L 12/811*  (2013.01)
*H04L 12/26*   (2006.01)
*H04L 29/08*   (2006.01)

(52) U.S. Cl.
CPC .......... *H04L 47/38* (2013.01); *H04L 43/0864* (2013.01); *H04L 43/0882* (2013.01);
(Continued)

(58) Field of Classification Search
CPC . H04L 47/38; H04L 43/0864; H04L 43/0882; H04L 43/0888; H04L 65/4069;
(Continued)

(56) References Cited

U.S. PATENT DOCUMENTS 7,099,954 B2   8/2006 Li et al.
7,180,858 B1 *  2/2007 Roy ................... H04L 43/0888
                                                          370/229
(Continued)

FOREIGN PATENT DOCUMENTS

WO   2014/082942 A1   6/2014

OTHER PUBLICATIONS

Mathis, "The macroscopic behavior of the TCP congestion avoidance algorithm," in ACM SIGCOMM, Pittsburgh Pennsylvania USA, Jul. 3, 1997.

*Primary Examiner* — Paul H Masur
*Assistant Examiner* — Michael K Phillips
(74) *Attorney, Agent, or Firm* — Jefferson IP Law, LLP

(57) ABSTRACT

A method and an apparatus acting as a server for estimating parameters of data transfer across a communication network are provided. The server includes a transceiver which enables data transfer operations and an estimator which estimates throughput as one of the parameters of the data transfer operations. The estimator further determines an indicator value of the throughput corresponding to an estimated bottleneck bandwidth (eBnBW) calculated from data traffic measurements. The indicator value is attributable to and indicates optimal parameters of the data transfer operations, calculated from measurements associated with the data traffic. The server apparatus includes a processor, in communication with the transceiver and the estimator, and the processor is configured to control for preparing succeeding data transfer operations to a client apparatus through the communication network based on the estimated bottleneck bandwidth determined by the estimator.

20 Claims, 6 Drawing Sheets

(52) U.S. Cl.
CPC ........ *H04L 43/0888* (2013.01); *H04L 67/325* (2013.01); *H04L 67/02* (2013.01)

(58) Field of Classification Search
CPC ....... H04L 65/80; H04L 67/02; H04L 67/325; H04L 47/27; H04L 47/10; H04L 47/193; H04L 47/283; H04L 69/163; H04L 43/0852; H04L 65/607; H04L 69/16; H04L 43/0894; H04L 1/0002; H04L 47/12; H04L 47/25; H04L 47/263; H04L 1/0014

See application file for complete search history.

(56) References Cited

U.S. PATENT DOCUMENTS

| | | | |
|---|---|---|---|
| 9,503,384 B1* | 11/2016 | Oliveira | H04L 43/0841 |
| 2004/0001691 A1 | 1/2004 | Li et al. | |
| 2005/0267743 A1* | 12/2005 | Gerlach | H04L 1/0014 704/221 |
| 2006/0203739 A1* | 9/2006 | Padmanabhan | H04L 41/0631 370/252 |
| 2007/0115814 A1* | 5/2007 | Gerla | H04L 1/0002 370/230 |
| 2011/0296485 A1 | 12/2011 | Nilsson et al. | |
| 2012/0307654 A1 | 12/2012 | Pantos et al. | |
| 2013/0007263 A1 | 1/2013 | Soroushian et al. | |
| 2013/0128735 A1* | 5/2013 | Li | H04L 47/25 370/230 |
| 2015/0381690 A1* | 12/2015 | Schmidt | H04L 65/4069 709/231 |
| 2016/0205164 A1* | 7/2016 | Schmidt | H04L 1/0001 709/219 |
| 2017/0353874 A1* | 12/2017 | Harrang | H04W 24/02 |

\* cited by examiner

DATA TRANSFER APPARATUS, DATA TRANSFER CONTROLLING METHOD AND DATA STREAM

CROSS-REFERENCE TO RELATED APPLICATION(S)

This application claims the benefit under 35 U.S.C. § 119(a) of a Filipino patent application filed on Aug. 19, 2015 in the Intellectual Property Office of the Philippines and assigned Serial No. PH 1-2015-000269 and a Korean patent application filed on Mar. 31, 2016 in the Korean Intellectual Property Office and assigned Serial No. 10-2016-0039034, the entire disclosures of which are incorporated herein by reference in their entirety.

TECHNICAL FIELD

The present disclosure relates to a data transfer apparatus acting as a server for transferring data to a client apparatus across a communication network. More particularly, the present disclosure relates to an apparatus and related method for estimating parameters of data transfer operations.

BACKGROUND

In the field of data transfer operations, it has generally been conventional to vary bitrate quality in accordance with the capability of an operating bandwidth of a communication network facilitating the data transfer from a server apparatus to a client apparatus. In the operations, the server apparatus determines the required operating bandwidth (hereinafter, referred to as 'bandwidth') for the available stream qualities through a manifest file which typically contains media segments for distribution and related settings. The client apparatus, on the other hand, selects which media segment to download based on an estimated parameter of the data transfer operations such as a bandwidth estimate. In many situations, an inaccurate bandwidth estimate causes many problems. For example, it causes playback interruption if the bandwidth estimate is higher than the actual bandwidth, or, otherwise, it results in non-optimal playback quality if the bandwidth estimate is lower than the actual bandwidth. In such situations, it is highly desirable to provide an estimated parameter of data transfer operations that is accurate enough to prevent disturbances in playback or data streaming at the highest available quality that can be downloaded with the current bandwidth capability of the communication network.

United States Patent Publication No. US 2007/0115814, published on 24 May 2007 and assigned to the Regents of the University of California, discloses in one of its embodiments a data processing apparatus arranged to cause generation of a rate estimate such as a bandwidth estimate and a rate sample based on the rate estimate, wherein the rate sample is exponentially averaged with a previous rate sample to produce smoothed rate estimate using a filter with time varying coefficients, and wherein the filter is embodied by an exponentially-weighted moving average (EWMA) filter, which is one form of a window function, arranged to determine filter gain and vary over time by adapting to a round-trip time (RTT) and other network conditions.

Window function is a mathematical method of taking a snapshot, or a subset, of multiple data points (instantaneous measurement) in a time series to be manipulated, processed, and analyzed. Values within the scope of the window defined by the window function may be taken as is or selected after being multiplied by a certain gain factor. Values outside the scope of the window, on one hand, are zero. The weight factors of the values inside the scope of the window may have certain effect on the estimate that the window function produces. Characteristics of the data affected by these weight factors may include smoothness, response to burst, etc. The data processing apparatus of the above mentioned related art is expected to provide a data processing apparatus that functions to prevent disturbances in playback or data streaming by way of applying the EWMA filter. It is, however, difficult to neglect the fact that each window function serving as the EWMA filter behaves differently relative to the others in respect of specific applications and signal types and properties.

In one instance, the underlying patterns from data in a hypertext transfer protocol (HTTP) based streaming rapidly change. Requests for transmission of data from one computer made through HTTP utilize transmission control protocol (TCP) as its underlying communication protocol. TCP has its own congestion avoidance, retransmission, and bandwidth control algorithms. One pertinent characteristic of TCP is its spurious throughput fluctuations. This fluctuation affects the accuracy of the process for determining an estimated operating bandwidth from instantaneous throughput measurements. A time-series analysis process utilizing only one window function as a filter such as the aforesaid EWMA may not be sufficient in capturing or reacting to underlying patterns from rapidly changing data. In this regard, a problem associated with the data processing apparatus of the above mentioned related art is that use of one type of window function in a time-series as a filter for producing smoothed rate estimate, i.e., bandwidth estimate, may not be effective at all times. The reason is that the best type of window function and its periodic behavior in terms of time-domain representations depend on each specific application as well as on the underlying patterns from rapidly changing data.

A need therefore exists for a data transfer apparatus and related computer-implemented method and data stream capable of providing data transfer operations and estimating parameters, which include throughput, of data transfer across a communication network. The present disclosure provides a method and apparatus, whereby values associated with the throughput are accurately estimated in a time series at all times notwithstanding spurious throughput fluctuations and inherent variable network conditions.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a data transfer apparatus acting as a server for estimating parameters of data transfer across a communication network.

In accordance with an aspect of the present disclosure, a server apparatus is provided. The server apparatus includes a transceiver which enables data transfer operations and an estimator which estimates throughput as one of the parameters of the data transfer operations. The estimator further determines an indicator value of the throughput corresponding to an estimated bottleneck bandwidth. The indicator value is attributable to and indicates optimal parameters of the data transfer operations, calculated from measurements associated with the data traffic in the communication network. In particular, the indicator value may be used to update an estimate of the bottleneck bandwidth, depending on congestion state of the communication network through which the data transfer operations take place.

The transceiver is configured to enable data transfer operations to and from a client apparatus in communication with the server apparatus through the communication network. The estimator is configured to measure the parameter (i.e., the throughput) of the data transfer operations. The estimator is also configured to convert the measured throughput or throughput measurements of the data transfer operations into time series (i.e., the throughput of the data transfer operations is measured in regular succession as a characteristic of the time series), and to determine the indicator value of the throughput of the data transfer operations converted into the time series.

The estimator particularly determines the indicator value by filtering, or applying a filter, on the values of the throughput as one of the parameters of the data transfer operations converted into the time series using an array of window functions. The process of passing the values through the filters consequently shapes the time series according to the shape of the window function. Among the filtered values, the estimator determines a maximum value. The indicator value therefore corresponds to the maximum throughput measurement within a window of throughput measurements. The processor is configured to prepare succeeding data transfer operations to the client apparatus through the communication network based on the indicator value determined by the estimator.

The throughput measurement may be a short-term measurement. The short-term maximum throughput measurement from a window of throughput measurements included in the array of window functions may be used to compute the estimated bottleneck bandwidth (eBnBW) in order to dampen the effect of mid-stream zero-traffic conditions of the data transfer operations. The array of window functions may include any two or more of the following window functions simple moving average, rectangular moving average, triangular window function, Hann window function, Gaussian window function, linearly weighted moving average, and exponential weighted moving average.

Providing the array of window functions characterizing the filter applied to the throughput measurements representing the parameter of the data transfer operations and the maximum throughput measurement ensures that an estimated parameter (i.e., the bottleneck bandwidth coinciding with the maximum achievable throughput for which data can be transferred across the communication network) ensures that the different behaviors of various window functions do not affect the accuracy of the estimated parameter. Providing them may also guarantee that the estimated parameter, i.e., the estimated bottleneck bandwidth, is accurately performed by the estimator of the server apparatus, despite the variation in periodic behavior of each one of the window functions included in the array of window functions in terms of time-domain representations of rapidly changing data.

The estimator may primarily include a network measurement sampling module, a window function smoothing module, and a bottleneck bandwidth estimation module. The network measurement sampling module provides instant network measurements which may include throughput of the succeeding data transfer operations, packet loss rates, and round trip times. The window function smoothing module ascertains the network traffic measurements as points in the time series and applies various window functions as shaping filters on multiple network traffic measurements to produce the estimated bottleneck bandwidth (eBnBW) of the data transfer operations. The bottleneck bandwidth estimation module determines an optimal window function included in the array of window functions as an estimator of the bottleneck bandwidth measurement based on the window function that produces an output value with minimal error rate in relation to a target value. The output value may serve as the updated bottleneck bandwidth estimate value, unless a congestion indicator value suggests that the current estimate should not be updated. The congestion indicator value, in addition to the indicator value, likewise affects the updated bottleneck bandwidth estimate.

In accordance with an aspect of the present disclosure, a computer-implemented method of controlling data transfer operations across a communication network based on estimated parameters of the data transfer operations is provided. The method includes the steps of (i) monitoring operating conditions of the communication network, (ii) measuring a parameter associated with the monitored operating conditions, (iii) converting the measured parameter into a time series, (iv) determining an indicator value of the parameter by filtering values of the parameter converted into the time series using an array of window functions and determining a maximum value from the filtered values of the parameter, and (v) selectively transcoding a data stream based at least on one indicator value as a function of other parameters associated with the monitored operating conditions.

The present disclosure also provides a data stream which is representative of a computer program having instructions which when executed by a processor cause the processor to perform the steps of (i) enabling data transfer operations to and from a client apparatus, (ii) measuring a parameter of the data transfer operations, (iii) converting the measured parameter of the data transfer operations into a time series, (iv) filtering values of the parameter of the data transfer operations converted into the time series using an array of window functions, (v) determining a maximum value from the filtered values of the parameter of the data transfer operations, and (vi) preparing succeeding data transfer operations to the client apparatus through a communication network based on the indicator value.

For a better understanding of the present disclosure and to show how the same may be performed, preferred embodiments thereof will now be described, by way of non-limiting examples only, with reference to the accompanying drawings.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
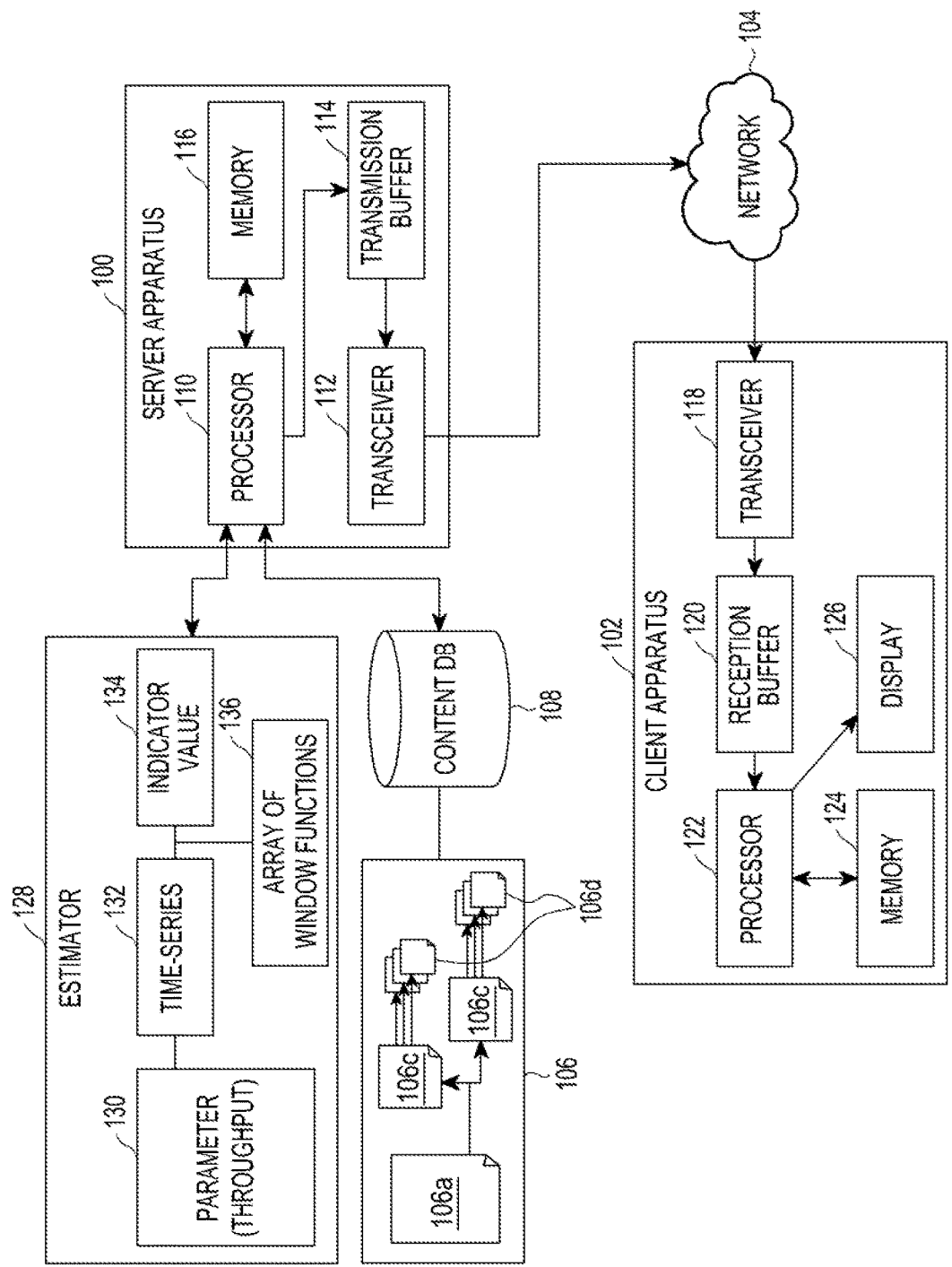
FIG. 1 is block diagram illustrating a configuration of a data transfer apparatus for use in estimating parameters of data transfer operations according to various embodiments of the present disclosure.

FIG. 1 is block diagram illustrating a configuration of a data transfer apparatus for use in estimating parameters of data transfer operations according to an embodiment of the present disclosure.

Referring to FIG. 1, the data transfer apparatus acts as a server and is consistently designated by reference numeral 100 throughout the ensuing description of the preferred embodiments of the present disclosure. The server apparatus 100 communicates with a client apparatus 102 over a communication network 104.

A manifest file or media playlist 106 includes a master playlist 106a that may be divided into smaller playlists 106c and then media segments 106d.

The manifest file or media playlist 106 may be provided by the server apparatus 100 and may indicate the location of stored media segments and various metadata of the media segments. Information that may be listed in the media playlist 106 may include the length of the segment (measurable in seconds) and the bandwidth (measurable in bps or bits per second or any scale thereof) required to play the media segment within a stream quality.

The media playlist 106 may be stored in a content database 108 and may be accessed by the server apparatus 100. The media playlist 106 is arranged for transmission to the client apparatus 102 in communication with the server apparatus 100 through the communication network 104. The server apparatus 100 is generally configured to cause content associated with the media playlist 106 to be encoded in multiple bitrate qualities by a processor 110 of the server apparatus 100 and communicate the encoded content with the client apparatus 102 over the communication network 104.

The communication network 104 may be used for communications of some or all of the components of the server apparatus 100 of the present disclosure and those of the client apparatus 102. The communication network 104 may be of the type that is known in the field of electronic communications such as, by way of examples, a packet network which includes an internet protocol (IP) network or Ethernet network facilitating exchange of variable sized packets and frames, an asynchronous transfer mode (ATM) network facilitating exchange of fixed-sized packets as a result of asynchronous time-division multiplexing, a 4G wireless broadband network such as the long term evolution (LTE) network facilitating exchange of particularly small-sized packets, and the like. It is to be understood and appreciated by a person skilled in the art that while the communication network 104 is embodied herein as those characterized by data communications, exchange of packets in the field of telecommunications through, for example, a public switched telephone network (PSTN) may alternatively be used in performing or enabling some or all of the components of the present disclosure.

In the present disclosure, the communication network 104 is, for example, a transmission control protocol/internet protocol (TCP/IP) network. IP facilitates sending and receiving of data packets between the server apparatus 100 and the client apparatus 102 over the Internet. TCP facilitates breaking of data down into smaller packets prior to transmitting them from the server apparatus 100 to the client apparatus 102. TCP also facilitates forming of the broken down packets once they have reached the client apparatus 102 as the destination point.

With reference to FIG. 1, the server apparatus 100 includes a transceiver 112, a transmission buffer 114 and a memory 116. One or more memories may be configured to store data and computer-executable program instructions in any suitable locations in the server apparatus 100. The memory 116 allows itself to be accessed by the processor 110 so that data may be prepared for transmission and instructions may be executed by the processor 110. The memory 116 may include one or more of a random access memory (RAM), a read-only memory (ROM), a ferroelectric RAM (FRAM), a dynamic RAM (DRAM), a synchronous DRAM (SDRAM), and the like.

The processor 110 capable of fetching and processing data from the memory 116 as well as executing instructions from the memory 116 may be a single processor or may be embodied as multiple processors for efficient data processing. The processor 110 may perform transcoding operations or, particularly, encoding or decoding of data sent to or from the server apparatus 100. The processor 110 may be disposed locally in relation to the server apparatus 100. The processor 110 may be disposed remotely from the server apparatus 100 through cloud based computing. Alternatively, the server apparatus 100 may make and use a suitable combination of locally and remotely located processors. For example, the server apparatus 100 may be a web server or hypertext transfer protocol (HTTP) server.

With reference to FIG. 1, the transceiver 112 is an interface device that is configured to perform data communications with the client apparatus 102 over the communication network 104. The transceiver 112 may be a single communication interface device capable of acting as a transmitter and a receiver through which communication packets may be routed. Alternatively, the processor 110 may receive and/or transmit network traffic instead of a separate component. In general, the transceiver 112 enables data transfer operations to and from the client apparatus 102. In particular, the transceiver 112 may be arranged to receive information representative of data packets from the processor 110 or any suitable access point serving as an intermediary for performing data communication with the client apparatus 102.

The transmission buffer 114 may be a circuitry associated with the server apparatus 100 for buffering communication data which may be divided into multiple-bit data frames of various quantity. Digital data bit-rate converted by the processor 110 acting as a transcoder is processed by the transmission buffer 114. The processor 110 is configured to monitor a change in the amount of data processed by the transmission buffer 114 in order to detect the speed of communication, i.e., variation in bandwidth, of the communication network 104.

Once the speed of communication or variation in bandwidth is detected, the processor 110 performs transcoding of communication data such that the bitrate of data transfer operations involving the communication data is switched to a certain level. Simply put, the bitrate is adjusted to a certain quality that a given bandwidth of the communication network 104 is capable of handling.

With reference to FIG. 1, the client apparatus 102, on the other hand, receives data packets transcoded by the processor 110 of the server apparatus 100 and transmitted through the transceiver 112 of the server apparatus 100. The client apparatus 102 may include the transceiver 118 enabling communications with the server apparatus 100 over the communication network 104, a reception buffer 120 for receiving data packets from the transceiver 118, a processor 122 for storing and/or fetching data and/or instructions to and from a memory 124, and a display 126 for graphically representing data executed for display by the processor 122.

The processor 122 may act as a decoder for decoding data packets originating from the server apparatus 100.

The client apparatus 102 may be a desktop computer, a laptop computer, a tablet personal computer, a smartphone, and other suitable data communication devices capable of communicating with the server apparatus 100 over the communication network 104. The client apparatus 102 may transmit a request for data stream to the server apparatus 100 over the communication network 104. For example, the request for data stream transmitted to the server apparatus 100 may be generated by a media browsing application executed on the client apparatus 102 by the processor 122 of the client apparatus 102. In response to the request for data stream, the processor 110 of the server apparatus 100 may prepare the requested data stream and send it to the client apparatus 102. The media browsing application may include a link or hyperlink to the data stream transmitted by the server apparatus 100.

In an embodiment of the present disclosure, the server apparatus 100 is configured to measure parameters of data transfer operations between the server apparatus 100 and the client apparatus 102 over the communication network 104.

The server apparatus 100 may be configured to, or include an estimator 128 configured to measure at least one of the parameters (or throughput) 130 of the data transfer operations. In the case the server apparatus 100 includes the estimator 128, a function of the estimator 128 may be executed not by any internal component but by the processor 110. Measurement operation to be performed by the estimator 128 of the server apparatus 100 refers to an instant measurement of the data transfer operation or "instant traffic measurement" or "instant network measurement." The parameters 130 primarily measured by the estimator 128 are network traffic parameters, such as throughput, packet loss rate (PLR), return trip time (RTT), etc., of the data transfer operations. Additionally, a congestion state indicator value 134 may be one of the instant network measurements that may be provided by the estimator 128.

With reference to FIG. 1, the estimator 128 is further configured to convert the measured parameters 130 of the data transfer operations into time series 132. In other words, and more specifically, the estimator 128 is configured to measure the throughput or provide throughput measurements of the data transfer operations in regular succession as a characteristic of time series. In this case, time series 132 data of the throughput or parameter 130 may be derived by the estimator 128. In that order, the network traffic measurements that include the data of the throughput or parameter 130 may be treated as points in the time series 132.

There are two methods for estimating the throughput: a passive method as a first method and an active method as a second method. The passive method is to obtain the estimated throughput by mathematical calculation based on measured variables, such as network traffic (e.g., RTT loss), network property, boundaries, etc. The active method is to obtain the estimated throughput by measuring responses of a network in actual current traffic. For example, it may obtain the estimated throughput by sending a probing signal or analyzing actual traffic.

A basic mathematical formula for obtaining a transfer rate is as follows:

$$T = \text{Data}_{size} / \text{Data}_{transfer-time}$$

where, T denotes a transfer rate, $\text{Data}_{size}$ denotes the size of data for transmission, and $\text{Data}_{transfer-time}$ denotes time required for data transmission.

The estimator 128 is also configured to determine an indicator value 134 of the network transfer parameter 130, i.e., the throughput, packet loss rate, and return trip time (RTT) 130, of data transfer operations converted into the time series 132. The indicator value 134 of the congestion state is taken from a plurality of values of the network transfer parameters 130 as the preferred measured parameter by the estimator 128 of the server apparatus 100. The congestion state indicator value is calculated from the network transfer parameters such as throughput, packet loss rate, return trip time, etc. The bottleneck bandwidth estimate is updated if the congestion state indicator reaches a threshold, and updates to a value determined by: (i) filtering the values of the throughput or parameter 130 as the preferred measured parameter of the data transfer operations converted into the time series; and (ii) determining a maximum value from the filtered values. An array of window functions 136, i.e., two or more window functions 136, may be used in filtering the throughput or parameter 130 values.

With reference to FIG. 1, the processor 110 of the server apparatus 100 is configured to prepare succeeding data transfer operations to the client apparatus 102 over the communication network 104 based on the indicator value 134 determined by the estimator 128 of the server apparatus 100. It is preferable that the throughput or parameter 130 measurements filtered using the array of window functions 136 are sampled in short-term (e.g., less than two seconds). Within a window of throughput measurements (e.g., ten throughput measurements), the maximum throughput or parameter 130 measurement is determined. As will be discussed in greater detail in the succeeding disclosure of the preferred embodiments of the present disclosure, the determined maximum throughput or parameter 130 measurement may be used in updating an estimated bottleneck bandwidth (or an estimate of the bottleneck bandwidth) in further data transfer operations that are subsequent to the data transfer operations during which the maximum throughput or parameter 130 measurement from a window of ten throughput or parameter 130 measurements is determined.

The indicator value 134 of the bottleneck bandwidth estimate (i.e., the maximum throughput or parameter 130 measurement derived from the window of ten throughput or parameter 130 measurements) is attributable to and indicates an optimal parameter (i.e., bottleneck bandwidth) of the further data transfer operations.

The bottleneck bandwidth is defined as a value of the bandwidth constrained by the network's slowest segment. In effect, the bottleneck bandwidth also coincides with the maximum achievable throughput or parameter 130 for which data may be transferred from the server apparatus 100 to the client apparatus 102 over the communication network 104. An estimated bottleneck bandwidth (eBnBW) may be set to be desirably and completely utilized. Ideally, a fully utilized bandwidth has the same level as the eBnBW which, in turn, means that the measured throughput has reached the actual bottleneck bandwidth. The bottleneck bandwidth corresponds to the bottleneck bandwidth estimate indicator value 134 for which the congestion indicator value reaches a threshold for optimally updating the bottleneck bandwidth estimate and for which the estimator 128 is configured to compute based on the monitored network traffic flowing to and from the client apparatus 102 relative to the server apparatus 100.

By virtue of an assumption that the upper-bound of the throughput or parameter 130 that the connection in the further data transfer operations can achieve is the same as the bottleneck bandwidth in current data transfer operations, the indicator value 134 represented by the maximum achievable throughput or parameter 130 may be used for calculating the bottleneck bandwidth of the further data transfer operations. The maximum achievable throughput or parameter 130 is calculated by the estimator 128 using the following series of mathematical functions:

$$T = W_{max} * MTU/RTT$$

$$T \leq Received_{window-state}/RTT$$

$$T = MSS/RTT\sqrt{P_{loss}}$$

where Wmax denotes a maximum of data packets to be contained in a window,

MTU is the maximum transmission unit or the maximum size of one packet,

RTT is the round-trip time or the time required for a packet to travel from one location to another, Receivedwindow-size denotes a size of a receive window, MSS denotes a maximum segment size or a maximum size of packets that TCP send, and Ploss(packet loss) denotes a packet loss or packet(s) that failed to reach a specific destination.

The above mathematical functions which may be used for computing the eBnBW are derived from E. A. Mathis, "The macroscopic behaviour of the TCP congestion avoidance algorithm," in ACM SIGCOMM, 1997, and the disclosure of which is incorporated herein by reference in its entirety.

Providing the array of window functions 136 characterizing the filter applied to the throughput or parameter 130 measurements representing the parameter of the data transfer operations and the maximum throughput or parameter 130 measurement ensures that providing an estimated parameter (i.e., the bottleneck bandwidth coinciding with the maximum achievable throughput or parameter 130 for which data can be transferred across the communication network 104) ensure that the different behaviors of various window functions 136 do not affect the accuracy of the estimated parameter. The reason is that they may be evaluated in order to determine which of them produces an accurate and reliable estimate of the bottleneck bandwidth. Providing them guarantees that the estimated parameter, i.e., the bottleneck bandwidth estimate, is accurately performed by the estimator 128 of the server apparatus 100, despite the variation in periodic behavior of each one of the window functions 136 included in the array of window functions 136 in terms of time-domain representations of rapidly changing data.

With reference to FIG. 1, the estimator 128 is further configured to determine a target indicator value (not illustrated) of the measured throughput or parameter 130. The target indicator value may be specifically used by the estimator 128 by comparing it with the indicator value 134 in order to select one of the window functions 136 included in the array of the window functions 136. The target indicator value may correspond to any one of a further measured throughput, a throughput of a media segment associated with the data transfer operations, and a rectangular moving average value, all of which will be discussed in greater detail in the following description of the preferred embodiments of the present disclosure.

In accordance with the present disclosure, the server apparatus 100 is capable of providing improved data transfer operations and estimation of parameters associated with the data transfer operations across the communication network 104. The server apparatus 100 accurately estimate the values associated with one or more of such parameters 130 in the time series 132 at all times notwithstanding spurious throughput fluctuations and inherent variable network conditions.

Figure 2:
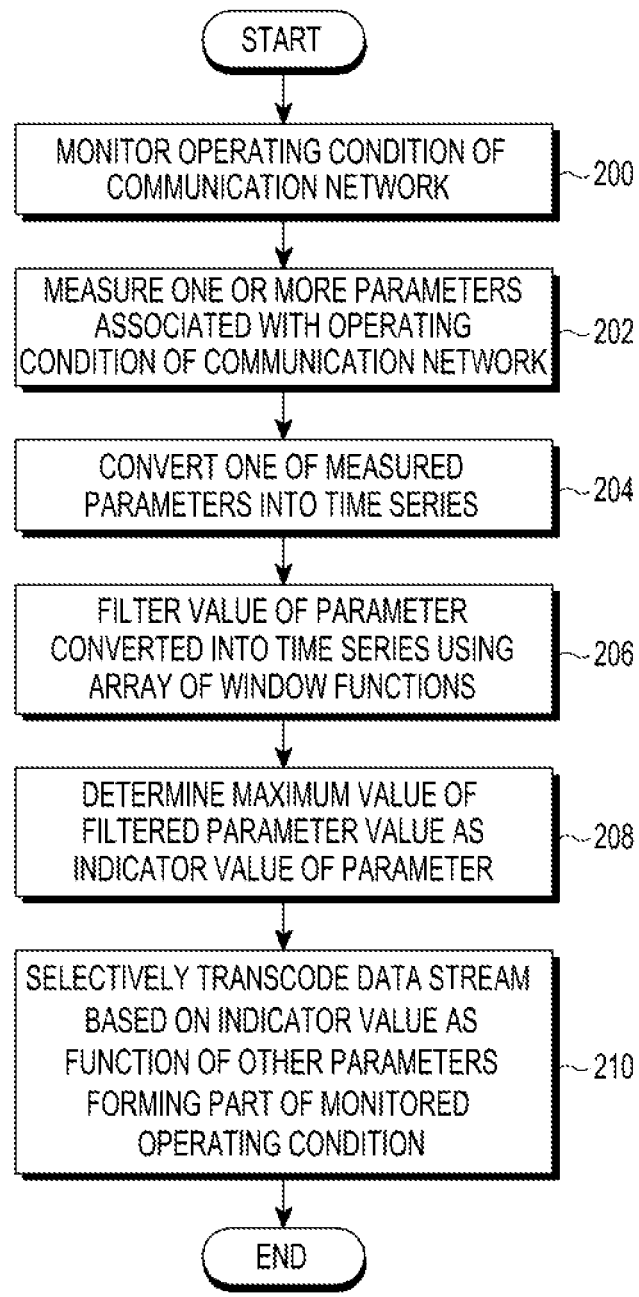
FIG. 2 is a flowchart illustrating a computer-implemented method of controlling data transfer operations according to various embodiments of the present disclosure.

FIG. 2 is a flowchart illustrating a method for the server apparatus to control data transfer operations across a communication network based on estimated parameters of the data transfer operations according to various embodiments of the present disclosure.

Referring to FIG. 2, a method for controlling the data transfer operations may be suitable for use in accelerating data transfer in an HTTP adaptive streaming. It is to be understood and appreciated that streaming using other suitable media streaming protocols may also constitute the applications in which the accelerated data transfer of the present disclosure may be used. Such other media streaming protocols may include (but are not limited to) HTTP live streaming (HLS), smooth streaming (SS), dynamic adaptive streaming over HTTP (MPEG-DASH), motion picture experts group (MPEG), HTTP dynamic streaming (HDS), real time messaging protocol (RTMP), and real-time streaming protocol (RTSP).

The flow starts by the server apparatus monitoring operating conditions of the communication network, in operation 200. The monitored operating conditions of the communication network may include, by way of examples, actual bottleneck bandwidth, available bandwidth, current throughput, and the like. The server apparatus measures one or more parameters associated with the operating conditions of the communication network, in operation 202, and then converts one of the measured parameters into a time series, in operation 204.

Once the time series data associated with the parameter of the operating conditions of the communication network have been set, the server apparatus determines an indicator value of the parameter. The indicator value may be determined by filtering values of the parameter converted into the time series using an array of window functions in operation 206, and then determining a maximum value from the filtered values of the parameter, as an indicator value of the parameter, in operation block 208. A data stream is selectively transcoded based on the indicator value as a function of other parameters forming part of the monitored operating conditions, in operation 210. The data stream may be a media stream selected from any one or a suitable combination of a video stream, an audio stream, a file transfer stream, a messaging stream, and a graphics stream.

The parameter of the data transfer operations from the indicator value may be a throughput, and the indicator value of the throughput corresponds to an estimated bottleneck bandwidth. The bottleneck bandwidth may include one or more of a congestion window (where a packet loss rate (PLR) may be observed) and a round trip time. The indicator value may be determined based on congestion state of the communication network through which the data transfer operations take place.

The method for controlling the data transfer operations may further include: (i) estimating an available bandwidth for transmitting a data stream to the client apparatus over the communication network based on the estimated bottleneck bandwidth (eBnBW) and a current throughput associated with the data transfer operations; (ii) varying bitrate of the data stream based on the estimated available bandwidth; and (iii) segmenting and serving content associated with the data stream according to the varied bitrate.

As mentioned, the present disclosure may be suitably used in accelerating data transfer for adaptive video streaming. Accelerated data transfer is a network acceleration solution that ensures uninterrupted playback and highest possible quality in an HTTP-based adaptive streaming (HAS). The solution provides a proxy that handles various methods for network acceleration. Imperative to this solution is a network throughput estimate that captures the actual operating bandwidth (i.e., the current throughput) of the network and the remaining unutilized bandwidth (i.e., the available bandwidth). The illustrated method for controlling the data transfer operations should be robust from fluctuating short-term measurements inherent to TCP, yet capable of enabling valid bandwidth changes.

Primary modules that may form part of the server apparatus of FIG. 1 may include a network measurement sampling module, a window function smoothing module, and a bottleneck bandwidth estimation module. The primary modules may be required for controlling data transfer operations to accelerate data transfer. Other modules that may form part of the server apparatus of FIG. 1 may include a bitrate adaptation module for switching of bitrate quality of the data stream, a TCP connection scheduler for configuring TCP connections, and a dynamic sub-segmentation module for dividing media segments into smaller chunk of data. The other modules may be required to control data transfer operations. Erroneous estimates may lead to sub-optimal streaming quality (in cases of underestimation) or playback interruptions (in cases of over-estimation). The network acceleration solution improves playback of HAS in the client apparatus and prevents such erroneous estimates.

The method further includes the steps of determining a target indicator value of the throughput, and selecting one of the window functions included in the array of the window functions based on a comparison of the indicator value and a target indicator value. The target indicator value may correspond to any one of a further measured throughput, a throughput of a media segment associated with the data transfer operations, and a rectangular moving average value.

It is to be understood and appreciated that the aforementioned modules associated with the method and with the server apparatus of FIG. 1 may or may not correspond to discrete blocks of software codes, depending on how they are arranged. It can be readily realized that the functions described for each of the modules may be performed by executing various code portions which are stored on one or more non-transitory, non-volatile computer-readable memory of the server apparatus of FIG. 1 at predetermined time intervals.

It is also to be understood and appreciated that the execution of the program codes from the non-volatile memory of FIG. 1 may be performed on appropriate computing resources, and that the modules are merely presented in segregated format based on their intended functions for the sake of illustrating how they are relevant to the implementation of one or more embodiments of the method and server apparatus of FIG. 1, among others, of the present disclosure. The modules may be fewer or greater in number, as it is well known in the art of computing that such program codes representing various functions of different modules may be combined or segregated in any suitable but efficient manner insofar as software execution is concerned.

Figure 3:
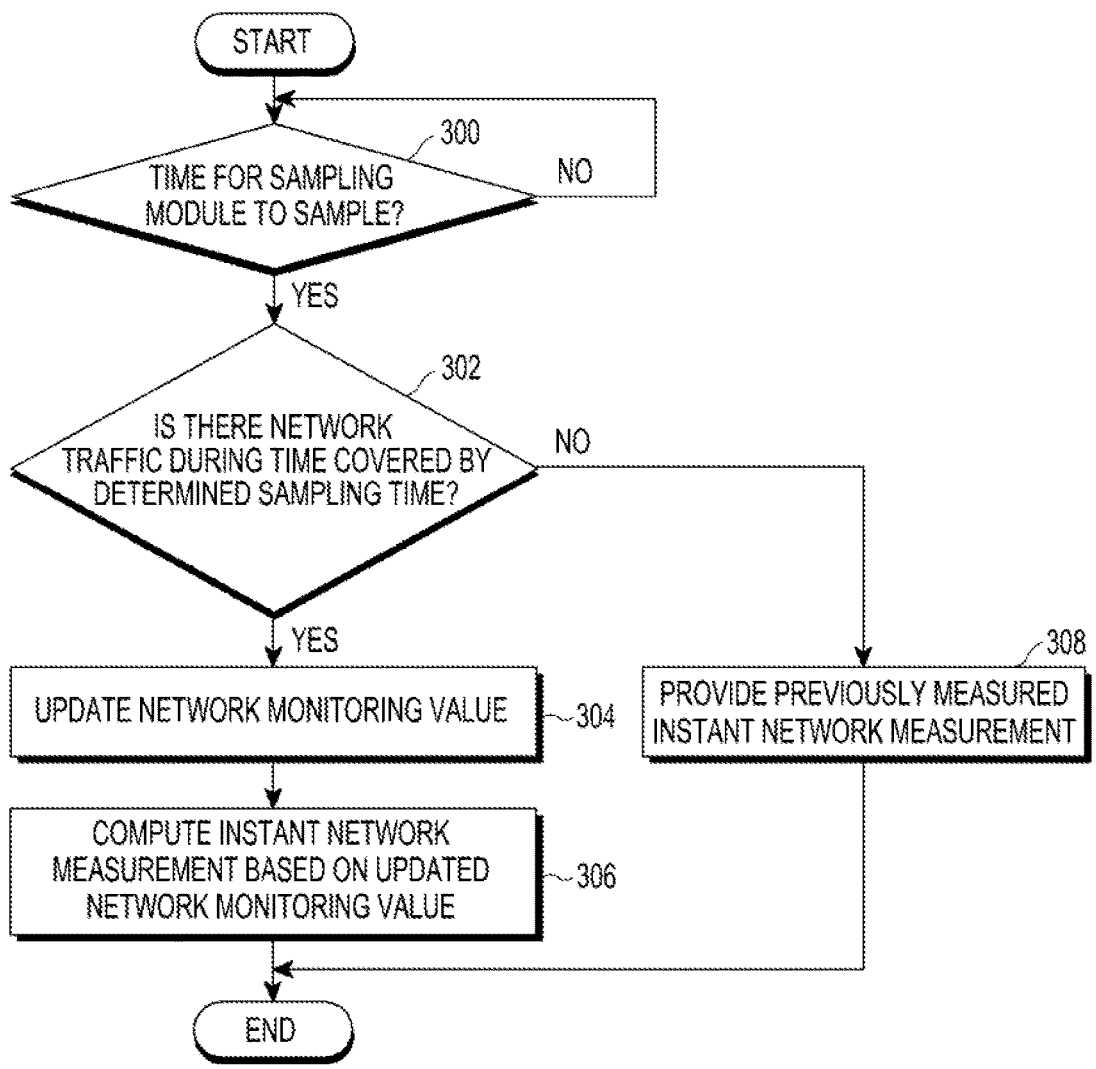
FIG. 3 is a flowchart illustrating a process performed by a network measurement sampling module according to various embodiments of the present disclosure.

FIG. 3 is a flowchart illustrating a process performed by a network measurement sampling module according to various embodiments of the present disclosure.

Referring to FIG. 3, the server apparatus determines if it is time for the sampling module to sample, in operation 300. If it is determined that it is time to sample, it is determined if there is a network traffic during the time interval covered by the determined sampling time, in operation 302.

If there is network traffic, network monitoring values are updated, in operation 304. Instant network measurements are computed based on the updated network monitoring values, in operation 306. The computed instant network measurements may include bottleneck bandwidth, available bandwidth, and current throughput. If there is no network traffic during the sampling time interval, instant network measurements previously measured are provided, in operation 308. The previously measured Instant network measurements may also include bottleneck bandwidth, available bandwidth, and current throughput.

The present disclosure may be data-driven. By the term "data-driven," it can be taken to mean that the present disclosure relies on data (i.e., network traffic measurements) computed by the network sampling module with the precondition that the network traffic is present. However, there are two cases where this precondition may not be satisfied. The first case is during an initial stage of data stream, and the second case is during mid-stream where there is discontinuity in network traffic due to inherent behavior of HTTP adaptive streaming.

In the data stream startup state (initial phase), data are inadequate yet. Thus, unreliable estimation may be natural in this initial phase of connection. While this phase is unavoidable, the algorithm constituting the network measurement sampling module may be designed to make transition from the startup state to steady state as fast as possible. As described above, an estimate of bottleneck bandwidth as one of the parameters required for the data transfer operations may be calculated based on the time-series data of the throughput. In the startup phase where there is no throughput measured yet, the network sampling module using the estimates must handle this zero-throughput case by giving default values. In the case where the final value to be computed is the number of connections for example, the number of TCP connections may be set to a default value in the startup phase.

Even a packet loss rate (PLR) is required to be calculated from a large amount of data packets transferred. A PLR estimated in the initial data streaming state where there are not many data packets that have been transferred may cause a problem due to precision issues. In an embodiment of the present disclosure, the minimum number of packets for data transfer may be set to about 2,000. This means that one lost packet in 2,000 may result in a precision of 0.0005 or 0.05% PLR.

A round-trip time (RTT), on one hand, may be calculated by obtaining an average RTT measured in data transfer during the startup state. With the configurations, no data transfer may be expected to result in zero-RTT which, in turn, makes the congestion factor zero. The congestion factor may be used in the form of first order derivative (i.e., the difference of current and previous congestion factors).

Moving forward to the mid-stream state, a zero-traffic case may also take place. The zero-traffic refers to having no data for transmission/reception, i.e., absence of data. The nature of HTTP streaming is that there are multiple requests for data during transmission/reception of the stream. The mid-stream zero-traffic state basically occurs during the time the previous segment download finishes and until the next request is made. In the mid-stream state, the throughput measurement is zero. The effect of the absence of data may be mitigated by using the throughput from either within a window of past measurements in the case of current data transfer operations or within a window of current measurements in the case of the succeeding data transfer operations. In mid-stream zero traffic condition, the PLR and RTT would be minimally affected since the measurement that may be used is an average of past measurements. As the PLR and RTT are merely used for computing the congestion factor, they should just reflect an state where there is no congestion.

Sampling time may be defined as the duration before a new measurement sample can be made. Appropriate sampling time is preferably set so as to capture changes in the network condition but retain robustness against noise or jitter in the network traffic. In choosing the preferred sampling time, some considerations may be necessary in e.g., developing the network measurement sampling module. First, the sampling time must be small enough so that small changes in the network may be resolved. Second, the sampling time must be kept small so that the transition phase from startup state to steady state may be minimized. Third, the sampling time should not be too short in that it becomes too unstable or prone to noise. The window function smoothing module may handle this issue of stability as will be shown in the following description of the present disclosure. Lastly, the sampling time should not be too short in that there could be too much oscillation or ringing.

Figure 4:
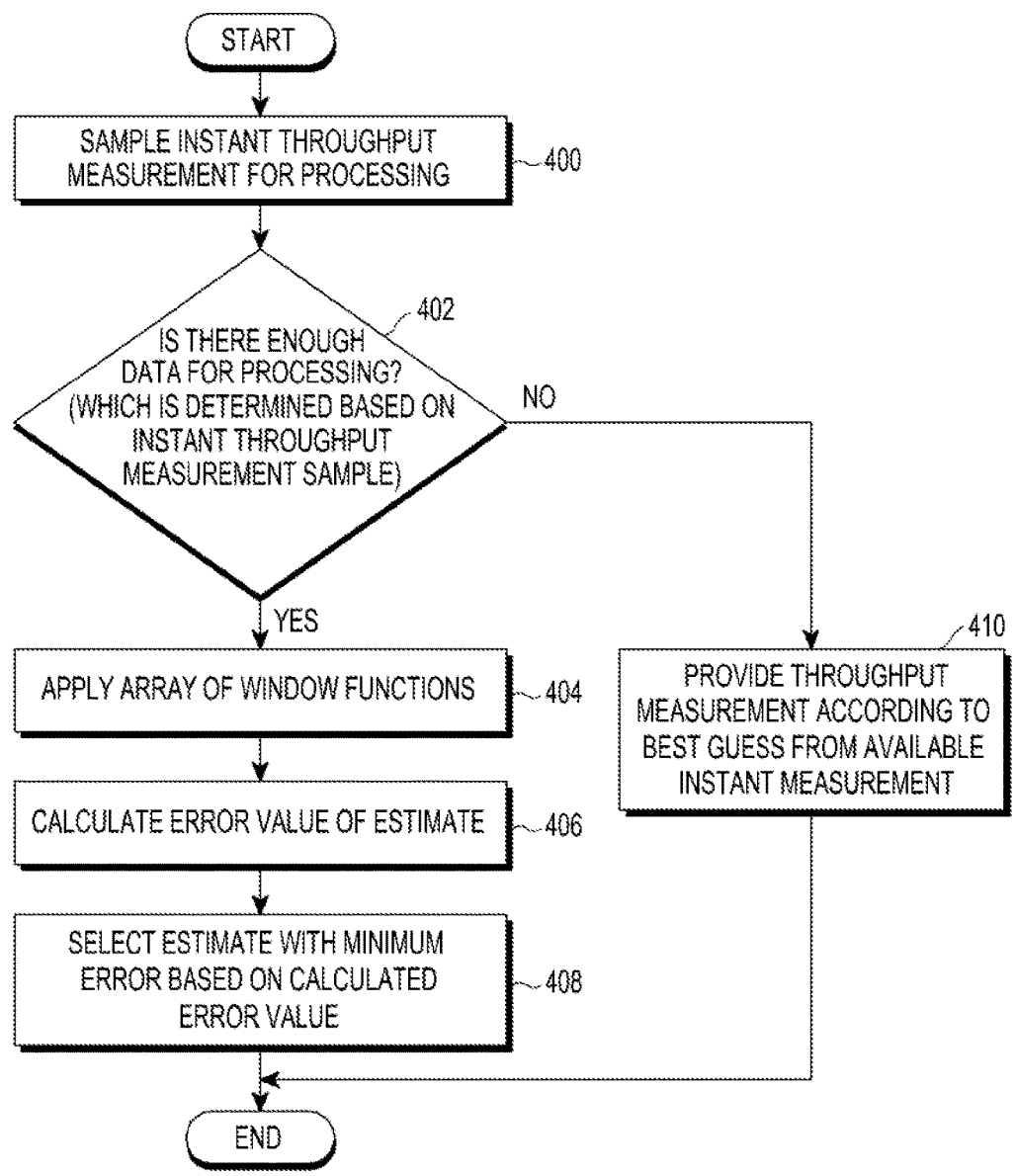
FIG. 4 is a flowchart illustrating a process performed by a window function smoothing module according to various embodiments of the present disclosure.

FIG. 4 is a flowchart illustrating a process performed by a window function smoothing module according to various embodiments of the present disclosure.

Referring to FIG. 4, the instant throughput measurement for processing may be sampled, in operation 400. The window function smoothing module determines whether there is enough data to be processed based on the instant throughput measurement sample, in operation 402. If it is determined that there is enough data to be processed, an array of window functions is applied, in operation 404. The application of multiple window functions to the instant throughput measurement sample causes accurate creation of throughput estimates.

Once the throughput estimates have been determined following the application of the multiple window functions, error values of the estimates are calculated, in operation 406. An estimate with least error is selected based on the calculated error values in operation 408.

However, in a case that not enough data is available to be processed, the insufficient data may cause the window function smoothing module to provide a throughput measurement according to the best guess. The best guess of the throughput measurement may be derived from available instant measurement where no window function may be applied, in operation 410.

With reference to FIG. 4, the window function smoothing module ascertains the network traffic measurements as points in time series and apply various window functions as filters on multiple network traffic measurements to produce an estimated parameter of the data transfer operations from which the network traffic measurements are derived. The parameter is a throughput and values of the parameter correspond to throughput measurements. The values corresponding to the throughput measurements are sampled in short-term time (preferably less than 2 seconds). The maximum value from the values within a window of measurements (e.g., current ten measurements) may be used to update an estimate of bottleneck bandwidth in succeeding data transfer operations. Correspondingly, the maximum value from the values within a window of measurements (e.g. past ten measurements) may be used to update an estimate of the bottleneck bandwidth in current data transfer operations.

The time series analysis involves processing a sequence of data in order to come up with meaningful information such as trends, dependencies, patterns, and other characteristics of the governing system and the data. A time series is usually plotted in line graphs and charts. A time series is usually plotted in line graphs and charts. On the other hand, frequency domain analysis is used to analyze the data in terms of its frequency components (histogram, spectrogram, etc.).

In terms of sampling, throughput measurement is performed regularly within short time intervals. The sampling addresses how often an instantaneous measurement should be taken. The basic unit of the sampling is the "instantaneous" measurement serving as an estimate of a point in time. Throughput may be regularly measured as opposed to merely determining such measurements on-demand (i.e., only when needed, or when a particular segment finishes download). In terms of instant measurement, throughput measurements are short term measurements which cover a short moment in time which is typically less than 2 seconds. The smallest possible throughput measurement in a point in time may be taken either on packets, on a block of data sub-segment, or on an entire media segment for each predetermined time interval.

If the smallest possible throughput measurement in a point in time is taken on a per packet basis, the following mathematical function may be used as a sample of bandwidth measurement (i.e., instant measurement) that can be used by the TCP connection:

$$T(i) = \frac{d_i}{t_i - t_{i-1}} = \frac{d_i}{\Delta_i}$$

where
ti−1 is the time the previous ACK was received,
Δi=ti−ti−1 is the last interval time.

The mathematical function is a formula for measurement of the smallest throughput. The mathematical function may be derived from how much faster a predetermined data chunk may be received at a particular point i in time.

Aside from the mathematical function, throughput estimates may be made by using information found in each packet. The function or equation is discussed in E. A. Mathis, "The macroscopic behaviour of the TCP congestion avoidance algorithm," in ACM SIGCOMM, 1997.

If the smallest possible throughput measurement in a point in time is taken based on the sub-segment data block, the media segments may be downloaded by sub-segments using the HTTP byte range request. By doing so, it is possible to obtain smaller chunk of data from which an estimate may be computed. The following mathematical function provides such a throughput measurement based on a block of data sub-segment.

$$T(i) = \text{subsegment}_{size}/\text{Data}_{transfer-time}$$

If the smallest possible throughput measurement in a point in time is taken on the basis of data per time interval, throughput may be measured on a regular time interval. The total data that arrived in a specified time interval may be counted. For example, if the sum of all the packets that arrived in one second is ten megabytes, throughput for that instance may be calculated to be ten megabytes per second using the mathematical function below.

$$T(i) = \text{Accumulated Data}_{Bytes}/\text{Time Interval}_{Time}$$

In terms of windowed throughput measurements, smoothing window functions are used on the instant measurements. The application of multiple window functions is a pre-processing method to improve an estimate of the bottleneck bandwidth as one of the parameters of the data transfer operations disclosed herein. As stated in the background section, windowing is a process of taking a snapshot, or a subset, of multiple data points (instantaneous measurement) in a time series to be manipulated, processed, or analyzed. Values within the scope of the window may be taken as is, or multiplied by a certain gain factor, and values outside the window are zero. The weight factors of the values inside the window has certain effect on the estimate the function produces. Among the affected characteristics are the smoothness and response to burst. The weight factors have certain characteristics even if they are analyzed in the frequency-domain.

In cases where the preconditions are not met (either in startup case, or midstream zero traffic), default values or measurements from previous points in time may be used as the bottleneck bandwidth estimate. In cases where there are no media segments downloaded yet, there are not enough data points to be fed to the window function smoothing module. Having enough data points is crucial, since there needs to be an initial estimate in order to select which starting bitrate quality to download. In the usual client-side implementation, the client selects the lowest available bandwidth to download. In the case of the present disclosure in accordance with its one or more embodiments, the initial throughput estimate from the measured instant throughput from the previous transactions (e.g., downloading the play lists) can be set. The play lists, being text file however, are very small in size, so accurate estimates may not be obtainable yet. On the contrary, this estimate might perform better than just naively selecting the lowest available bandwidth. There are two ways that the playlist may be used on downloading for the initial estimator.

First, the size of a playlist can be divided into the time to download the playlist, as shown in the following mathematical function.

$$T\text{Estimate}_{Initial} = \text{Size}_{Playlist}/\text{Time}_{ToDownloadPlaylist}$$

The mathematical function is about estimation of an initial throughput. The mathematical function is based on time required to download the playlist.

The playlist including media to be played is a small file. The small file may be a divided file having a size suitable for initial estimation.

Second, it is also preferable to use the function or equation derived from E. A. Mathis, "The macroscopic behaviour of the TCP congestion avoidance algorithm," in ACM SIGCOMM, 1997 in calculating the initial throughput estimate, as shown in the following series of mathematical functions.

$$T\text{Estimate}_{Initial} = W_{max}*\text{MTU}/\text{RTT}$$

$$T \leq \text{MSS}/\text{RTT}\sqrt{P_{loss}}$$

Figure 5:
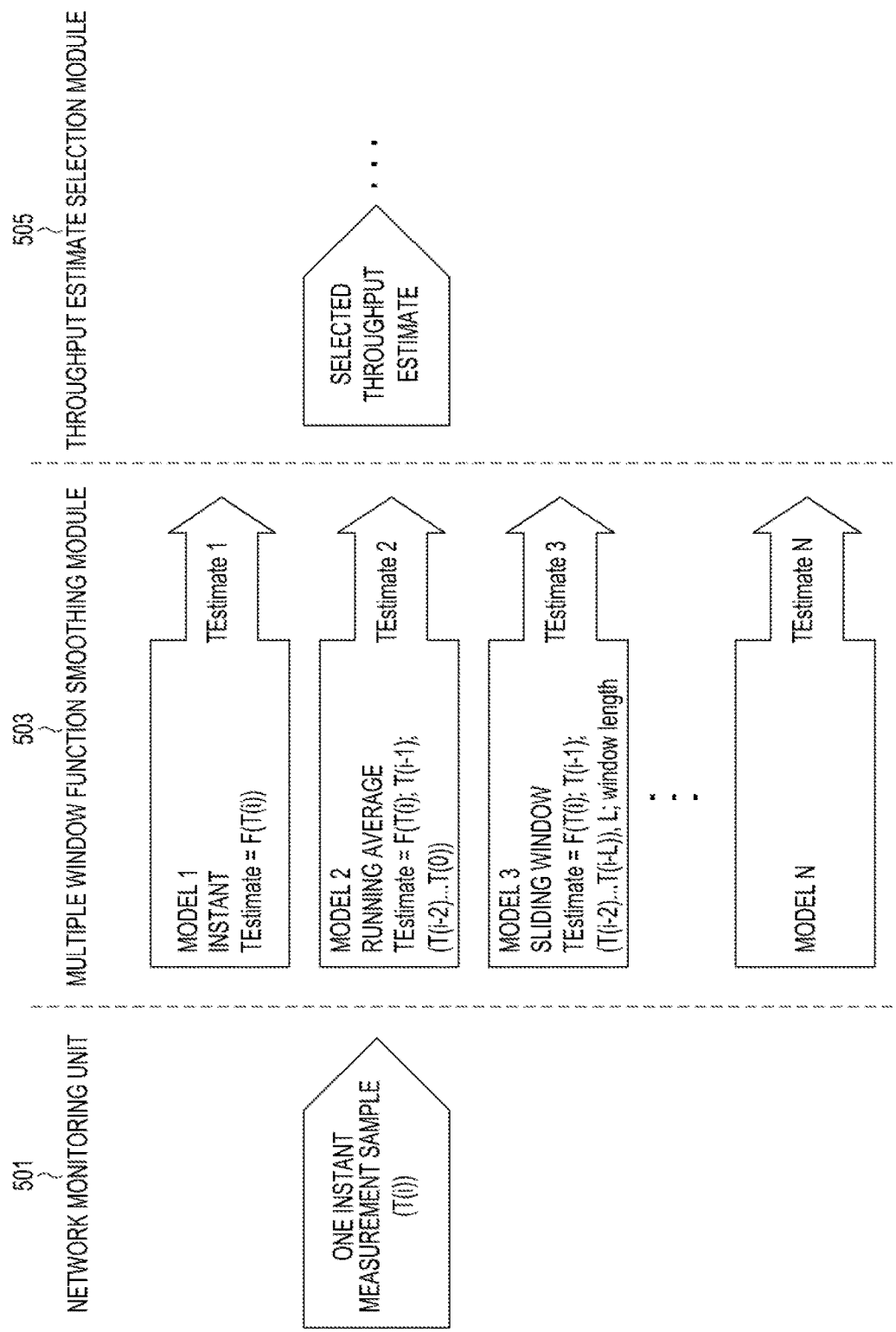
FIG. 5 is a schematic representation of the window function smoothing module according to various embodiments of the present disclosure.

FIG. 5 is a schematic representation of the window function smoothing module according to various embodiments of the present disclosure.

Referring to FIG. 5, a window function smoothing module 503 is connected to a network monitoring unit 501 in which applications of multiple window functions each monitor network operating conditions, and a throughput estimate selection module 505 for selecting an optimum throughput estimate.

The network monitoring unit 501 transfers an instant measurement sample T(i) to the multiple window function smoothing modules 503.

The multiple window function smoothing module 503 apply the sample to multiple window functions to calculate a throughput measurement.

The throughput estimate selection module 505 selects an optimum throughput estimate from among throughput measurements applied to the multiple window functions.

The data transfer apparatus and method for controlling data transfer of the present disclosure makes use of the array of window functions or, more particularly, window smoothing function. Each window function included in the array of window functions has a different response to bursts and different steady-state transition time as compared with others. Depending on the shape and mathematical characteristic of the function, a window function included in the array of window functions may be robust to short term changes in exchange of a longer transition time to steady-state. On the other hand, a very reactive window function included in the array of window functions may have a tendency to be unstable and susceptible to jitter and noise.

The array of window functions may include any two or more of the following window functions: simple moving average, rectangular moving average, triangular window function, Hann window function, Gaussian window function, linearly weighted moving average, and exponential weighted moving average. In addition, other types of window functions having different mathematical characteristics may be added to the non-exhaustive list of window functions mentioned.

A simple moving average or rectangular moving average capable of serving as the window function estimator has the same weight for the samples in the window. The simple moving average or rectangular moving average may be called a rectangle since the weight for each sample in the window is the same and visually resembles a rectangle. The simple moving average or rectangular moving average may be applied using the following mathematical function.

$$T\text{Estimate}_{SampleMA} = T(t) + T(i-1) + T(i-2) \ldots T(0)/t$$

The mathematical function is about a throughput estimation using a simple moving average formula. The mathematical function provides information about a throughput related to history of data received for a particular time interval i.

An array of window functions may be used to filter throughput measurements. General weighted window functions may also be included in the array of window functions. For the general weighted window functions, the following mathematical function may be used.

$$T\text{Estimate}_{SW} = \sum_{n=0}^{n=L-1} w_n T(i-n)$$

The measurements during the particular time interval i are filtered using the window functions as a means for taking into account priority. To obtain a weighted estimate based on a particular filter, the mathematical function may be used. Data outside the window is zero.

Samples within the window have corresponding weights depending on the characteristics of the window. Triangular, Hann, and Gaussian windows may be computed using the following mathematical functions.

$$w(n)_{triangular} = 1 - \left| \frac{n - \frac{N-1}{2}}{L/2} \right|, , L \text{ may be } N, N+1 \text{ or } N-1.$$

The triangular window function is known as the Bartlett window that converges to a large N. The triangular window function is a result of convolution of a rectangular window that is 2 N/2 wide.

$$w(n)_{Hann} = 0.5 - \left(1 - \cos\left(2\pi \frac{n}{N}\right)\right), 0 \le n \le N$$

The Hann window function is also known as Hanning. The Hann window function has a similar shape to the Hamming window function.

$$W(n)_{Gaussian} = e^{1/2(\alpha(N-1)/2^{n(N-1)/2})^2}, \sigma \le 0.5$$

The Gaussian window function is originated from the Gaussian equation. The Gaussian equation explains general distribution.

A linearly weighted moving average (LWMA) may also be included in the array of window functions. In terms of throughput estimate, the linearly weighted moving average may be mathematically expressed as follows:

$$T\text{Estimate}_{LWMA}(i) = \frac{nT(i) + (n-1)T(i-1) + \ldots + 2T(i-n+1) + T(i-n)}{n + (n-1) + \ldots + 2 + 1}$$

The linearly weighted moving average applies a bit higher weight to recent data as compared to the simple moving average. The linearly weighted moving average may be computed by multiplying the respective sample points and corresponding location values in the data series. The linearly weighted moving average may be used for throughput estimation.

Further, an exponential weighted moving average (EWMA) may form part of the array of window functions. The exponential weighted moving average may be mathematically expressed as follows:

$$T\text{Estimate}_{EWMA} = [\alpha T(i) + (1-\alpha)T(t-1) + (1-\alpha)^2 T(i-2) + (1-\alpha)^3 T(t-3) \ldots ]$$

$$T\text{Estimate}_{EWMA}(i) = [\alpha T(i) + (1-\alpha)T\text{Estimate}(i-1)], i > 1$$

$$T\text{Estimate} = T(t); t = 0$$

where T(i): instant throughput.

The exponential weighted moving average is similar to be linear in that it gives a weight to an individual element in the data series. The exponential weight moving average introduces smoothing equation alpha that explains how the weights are distributed.

A method for controlling data transfer operations across a communication network based on estimated parameters of the data transfer operations in conjunction with the process performed by the window function smoothing module may also include selecting one window function from the array of window functions. The selection from the output values of multiple windows may be performed by determining a target indicator value of the throughput measurement representing one of the parameters of the data transfer operations and then selecting a value associated with the output of each window function included in the array of window functions that is closest or nearest to the determined target indicator value. The selection may be made by comparing the indicator value and the target indicator value. The same selection may also be performed even by the server apparatus 100 illustrated in FIG. 1.

While multiple throughput estimates may be derived from the multiple window functions, only one window function that may be derived as being closest or nearest to the determined target indicator value may be considered the optimum. In that case, the best estimate that helps to achieve the goal of uninterrupted playback and optimal bitrate quality may be selected. As mentioned, the window functions included in the array of window functions may be evaluated by calculating errors of the estimates that they produce based on the "target" indicator value. The target indicator value used for evaluating the window functions may include any of one or more of the following items: (i) the most recent instantaneous measurement (T(i)); (ii) the most recent media segment throughput (size of previous media segment over download time); and (iii) rectangular moving average value.

As a form of feedback, evaluation of the window functions as discussed above may be implemented by the server apparatus of FIG. 1 and by the method of controlling data transfer operations of FIG. 2, wherein each of the window functions as estimators is evaluated based on its capacity to estimate or forecast the value at i+1 based on the N instant measurements within the range of i and i−N+1. For example, the throughput estimate for i+1 may be based on the output from inputs {i−4, i−3, i−2, i−1, i}. In this case, an estimator error may be computed using the following mathematical function.

% error(i)=TWin(i)−Target(i)/Target(i)

The mathematical function is used to help the estimator determine an estimate closer to actual throughput among given possible estimates.

After the output values of the window functions are collected, the optimal window function as an estimator of the throughput as one of the parameters measured for the data transfer operations may then be determined based on the window function that produces an output value with minimal error rate in relation to the target indicator value. The output value may serve as the updated bottleneck bandwidth estimate value, unless a congestion indicator value suggests that the current estimate should not be updated. The congestion indicator value, in addition to the indicator value of at least one parameter of the data transfer operations described herein, likewise affects the updated bottleneck bandwidth estimate.

Consequently, only one throughput which will be used by the bottleneck bandwidth estimation module may be required. Hence, it is highly desirable for the bottleneck bandwidth estimation module to use the output value of the window function that is considered as the optimal estimator. For this purpose, the following specific configurations may be used: (i) estimation frequency is performed on fixed regular intervals; and (ii) target indicator value for computing the error function is the rectangular moving average.

Other configurations may, however, be used for determining the output value of the window function that is considered as the optimal estimator by the window function smoothing module. In order to conserve processing power of the server apparatus of FIG. 1 in one instance, the optimal window function estimator from the moment it is determined may be used in all succeeding data transfer operations within any given time interval. This may avoid the need to repeatedly compute the output values of the multiple window functions serving as estimators. In this case, if there is a need to update the optimal window function estimator after it has been determined and subsequently used within a predetermined time period, the process of selecting a window function estimator may be set to be triggered by certain events such as interruption or underflow. Alternatively, the process of selecting a window function estimator may be preconfigured to be initiated at fixed regular intervals.

Since the window function estimator that may be considered having the optimal and best-performance is the one with the minimum error, a window function's estimation capability may be assessed using the formula for the mean squared error (MSE), as shown in the following mathematical function.

$$MSE_{winj} = \frac{1}{n}\sum_{i=1}^{n}(TWin_j(i) - \text{Target}(i))^2$$

where optional window function estimator=min{$MSE_{Winj}$};

Winj may be any of the window functions (e.g., EWMA, LWMA, Hann, etc.);

TWin denotes an estimated/forecasted throughput using a particular estimator; and Target denotes the target measurement.

To evaluate a quality of the estimator, a risk function, which is a mean square error equation of throughput measured by the window function and received actual throughput, may be used.

Figure 6:
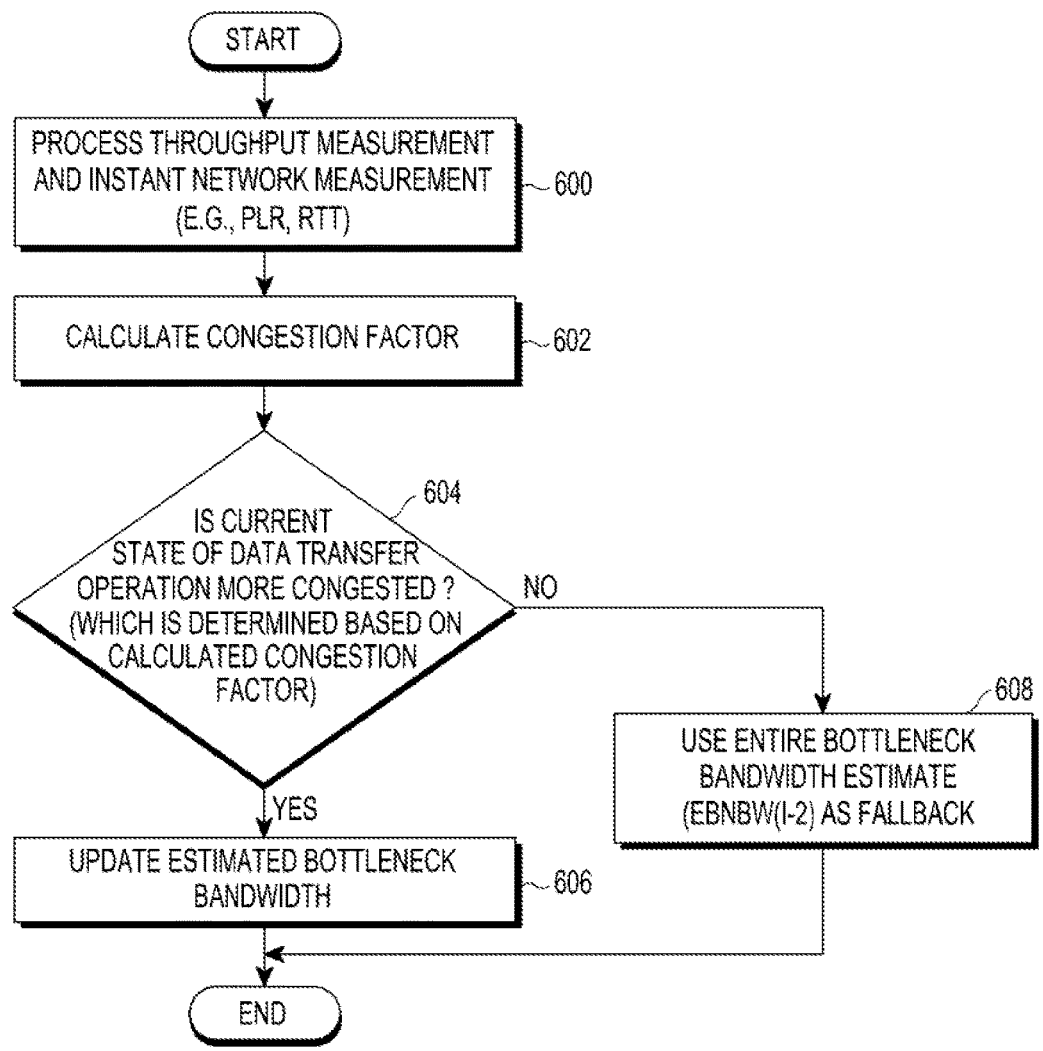
FIG. 6 is a flowchart illustrating a process performed by a bottleneck bandwidth estimation module according to various embodiments of the present disclosure.

FIG. 6 is a flowchart illustrating a process performed by a bottleneck bandwidth estimation module in accordance with various embodiments of the present disclosure.

Referring to FIG. 6, the bottleneck bandwidth may be estimated using short-term throughput measurements. The maximum measured throughput from the snapshot or window of estimates may be used to update the bottleneck bandwidth estimate. The short-term maximum throughput measurement may be the maximum from a snapshot or a window of previous measurements (e.g., past ten measurements) for current data transfer operations or a window of current measurements (e.g., current ten measurements for succeeding data transfer operations. The short-term maximum throughput measured may be used to compute the estimated bottleneck bandwidth (eBnBW) in order to dampen the effect of mid-stream zero-traffic conditions of any data transfer operations.

In the flow, throughput measurements and the instant network measurements (e.g., PLR, RTT) are processed by the bottleneck bandwidth estimation module, respectively, in operation 600. Once the throughput measurements and the instant network measurements are arranged in order for processing and analysis, the bottleneck bandwidth estimation module calculates the congestion factor, in operation 602. The bottleneck bandwidth estimation module determines whether the current state of the data transfer operations is more congested, based on the calculated congestion factor, in operation 604. If it is determined that the current state of data transfer operations is more congested (in other words, "YES" for the determination operation 604), the bottleneck bandwidth estimation module automatically updates the estimated bottleneck bandwidth (eBnBW) in operation 606. Otherwise, if it is determined that the current state of data transfer operations is not more congested (in other words, "NO" for the determination operation 604), the bottleneck bandwidth estimation module uses the previous bottleneck bandwidth estimate (eBnBW(i−2)) as a fallback, in operation 608.

As described above, the bottleneck bandwidth estimate may be determined using the function or equation disclosed in E. A. Mathis, "The macroscopic behaviour of the TCP congestion avoidance algorithm," in ACM SIGCOMM, 1997. For multiple TCP connections involving data transfer operations, the following mathematical function which is a modification of the Mathis function or equation may be used in estimating the bottleneck bandwidth.

$$BB = \sum_{t=1}^{k}\left[\left(\frac{1}{RTT}\right)\left(\frac{MSS}{\sqrt{PLR}}\right)\right]$$

where k=the number of TCP connections

The mathematical function BB was disclosed and obtained from the work of Mathis on the maximum achievable throughput in TCP connection. Combining all the possible cases of TCP connection is to obtain the whole possible bottleneck bandwidth from a pipe. The fundamental assumption succeeded from the use of the work of Mathis may still be applied (i.e., small loss rate).

Consequently, the value of the bottleneck bandwidth eBnBW may be updated based on n-most recent maximum throughput measurements. Two most recent samples may be used in updating the bottleneck bandwidth value eBnBw. In this case, the following mathematical function may be used.

$$eBnBW_i = \gamma(ActualMAxTP_i + ActualMAxTP_{i-1})$$

$$\gamma = \tfrac{1}{2} = 1/n$$

Alternatively, the effect of different samples through maximum throughput measurements with respect to time may be given weight, as shown in the following mathematical function.

$$\gamma = w/n;\ W = \begin{bmatrix} W_1 \\ \vdots \\ W_n \end{bmatrix};\ \sum W_1 + \ldots + W_n = 1$$

$$eBnBW_T = [ActualMaxTP_1 \ \ldots\ ActualMaxTP_n] \times \begin{bmatrix} W_1 \\ \vdots \\ W_n \end{bmatrix} \times 1/n$$

The estimated bottleneck bandwidth (eBnBW) is an average of recent throughput measurements. The simple moving average having the discrete number of samples may be used to take into account a recent-most change in throughput or to provide a smoothing function $\gamma$. The smoothing function may indicate a weight for a sample point considered crucial.

For the purpose of accelerating the data transfer using the illustrated server apparatus, and related method and processes of the present disclosure, at least three parameters of data transfer operations may be measured, namely: the available bandwidth (AB), the bottleneck bandwidth (BB), and the current throughput (CT) of the current data transfer operations. The current throughput may be obtained directly from the instant network measurements while the available bandwidth may be obtained using the maximum throughput measurements as discussed above. The available bandwidth, on the other hand, is the parameter of data transfer operations that is required to manipulate the TCP connections with the end in view of accelerating the data transfer operations involved in the same TCP connections.

Depending on the value of the available bandwidth, the number of connections to be added or created, the available bandwidth is the remaining unutilized bandwidth calculated from the bottleneck bandwidth estimate and the current throughput of the current data transfer operations. Hence, the equation AB (available bandwidth)=BB (bottleneck bandwidth)−CT (current throughput). Stated differently, the available bandwidth corresponds to the size of bandwidth not yet utilized in the previous data transfer operations relative to the current data transfer operations. An optimized network means a minimized available bandwidth and, for this reason, the goal is to have the value of the available bandwidth to be as minimum as possible based on the values of the bottleneck bandwidth and the current throughput. Accordingly, an accurate estimate of the bottleneck bandwidth sets the value of the available bandwidth to the minimum.

In order to ensure the accuracy of the bottleneck bandwidth estimate, the server apparatus and related method and processes of the present disclosure may be configured to provide an adaptive or reactive window function which estimates the bottleneck bandwidth. In this case, the output value of each window function included in the array of window function may be computed differently depending on the congestion status of the network through which the data transfer operations take place. Thus, the process for updating the bottleneck bandwidth estimate may be made to depend on the congestion state of the network which is represented by the congestion factor and the changes associated with it. The congestion factor (Ci) is a variable based on the Mathis equation for calculating the throughput, as shown in the following mathematical function:

$$MathisTP \leq MSS/RTT\sqrt{PLR}$$

$$C = 1/RTT\sqrt{PLR}$$

The work of Mathis related to the maximum throughput equation has a simple form that may be used. Under the assumption that MSS is determined in the system by a combination of the network architecture and MTU, it is reasonable to consider the MSS as a constant. A factor that may affect the throughput may be one of what are used as determination factors for congestion.

As the network becomes congested, the RTT and PLR are known to increase and thus affect the congestion factor. In this regard, estimations provided by the server apparatus, method of controlling data transfer operations and related processes of the present disclosure may take into consideration the various congestion states and the behavior of estimation processes in each of those congestion states. In other words, the estimation processes behave differently depending on whether the network is in a congested or non-congested state. Taking the congested state in relation to previous values of the congestion factor into consideration, a relative congestion state may be reached.

In the non-congested state, the bottleneck bandwidth estimate may be updated when the network is not congested. In this case of no congestion taking place, the PLR and the RTT may be assumed to have stable values. In terms of estimation behavior in the non-congested state, the estimation transition time from startup to the steady-state may be minimized by using the short-term maximum throughput measurements in calculating the bottleneck bandwidth estimate as discussed above. In the non-congested state, the eBnBW value may be based on the n-most recent maximum throughput measurements. As mentioned, in determining the eBnBW estimate, either two most recent samples or the weight associated with the effect of the different samples with respect to time may be used.

In an increasing congestion state, the bottleneck bandwidth estimate may be reset to a previous calculation, back to a state prior to the occurrence of congestion. In this case where there is a congestion increasingly taking place, at least one of the two values associated with the PLR and the RTT is likely to increase, effectively decreasing the congestion factor. In terms of estimation behavior in the congested state, the server apparatus and the method for controlling data transfer operations and related processes may cause the eBnBW to fall back to a previous value prior to the congestion state. This is because the previous bottleneck bandwidth estimate is believed to have caused the increased or increasing congestion state in the current data transfer operations.

In the increasing congestion state, updating the eBnBW based on the two most recent actual maximum throughput measurements as with the case of non-congested state is likely detrimental since those recent measurements may lead to the current congested state. Furthermore, increasing the eBnBW of an already congested network is detrimental. Thus, the appropriate approach for the congested state in current data transfer operations is to fall back to the eBnBW calculated in the previous data transfer operations or prior to the time leading to the congested state in the current data transfer operations. Therefore, the following logic may be applied by the server apparatus, and method of controlling data transfer operations and related process.

if $C_i < C_{i-1}$ and $eDnDW_i < eDnDW_{i-2}$; then
    $eDnDW_i = eDnDW_{i-2}$ If a congestion state is caused to the previously estimated bottleneck bandwidth (eBnBW) in the current data transfer operation, given a congestion factor that has already been calculated is given, it is appropriate and desirable to consider an estimate that was used in the same data operation as a previous estimate. Unlike TCP's multiplicative decrease which effectively penalizes the download speed by half, the estimation processes of the present disclosure may prevent themselves from being penalized greatly by falling back to the n+1 state. For example, if n=2, we refer to 3 values back which is i−2.

Since previous eBnBW may have caused the congested state in the current data transfer operations, it is appropriate and preferable that the estimate to be used in the same data transfer operations is the estimate prior to that state.

Unlike TCP's multiplicative decrease which effectively penalizes the download speed by half, it is preferable that the estimation processes of the present disclosure be prevented from being penalized greatly by falling back to the n+1 state (e.g., if n=2, we refer to 3 values back which is i−2).

Yet another aspect of the present disclosure provides a data stream which is representative of a computer program having instructions which when executed by a processor cause the processor to perform the steps of: (i) enabling data transfer operations to and from a client apparatus; (ii) measuring a parameter of the data transfer operations; (iii) converting the measured parameter of the data transfer operations into a time series; (iv) filtering values of the parameter of the data transfer operations converted into the time series using an array of window functions; (v) determining a maximum value from the filtered values of the parameter of the data transfer operations; and (vi) preparing succeeding data transfer operations to the client apparatus through a communication network based on the indicator value.

The parameter of the data transfer operations in the data stream is a throughput having an indicator value that corresponds to an estimated bottleneck bandwidth. The processor of the data stream further performs the steps of determining a target indicator value of the throughput, and selecting one of the window functions included in the array of the window functions based on a comparison of the indicator value and the target indicator value. The target indicator value corresponds to any one of a further measured throughput, a throughput of a media segment associated with the data transfer operations, and a rectangular moving average value. The indicator value in the data stream may be determined based on a congestion state of the communication network through which the data transfer operations take place.

Various embodiments have been described, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes. Furthermore, the embodiments may be operated by being combined with one another if necessary.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for estimating parameters of data transfer across a communication network, the apparatus comprising:
   at least one processor configured to control to:
   measure at least one parameter required for data transfer,
   convert the measured at least one parameter into at least one time series parameter,
   filter the at least one time series parameter by using an array of window functions into filtered parameter values,
   determine a maximum value of the filtered parameter values as an indicator value of the parameter, and
   selectively transcode a data stream based on the indicator value of the parameter; and
   a transceiver configured to transfer the transcoded data stream.

2. The apparatus of claim 1, wherein the array of window functions includes at least two or more of:
   a simple moving average,
   a rectangular moving average,
   a triangular window function,
   a Hann window function,
   a Gaussian window function,
   a linearly weighted moving average, or
   an exponential weighted moving average.

3. The apparatus of claim 1, wherein the at least one parameter comprises a throughput.

4. The apparatus of claim 3, wherein the throughput corresponds to an estimated bottleneck bandwidth (eBnBW).

5. The apparatus of claim 4, wherein the estimated bottleneck bandwidth (eBnBW) includes one or more of a congestion window or a round trip time.

6. The apparatus of claim 1, wherein the at least one processor is further configured to control to determine at least one target indicator value of the measured at least one parameter.

7. The apparatus of claim 6, wherein one of the window functions included in the array of the window functions is selected by the at least one processor based on a comparison of the indicator value of the parameter and the at least one target indicator value.

8. The apparatus of claim 7, wherein the at least one target indicator value corresponds to one of a further measured parameter, a throughput of a media segment associated with a data transfer operation, or a rectangular moving average value.

9. The apparatus of claim 1, wherein the indicator value of the parameter is determined based on a congestion state of the communication network through which the data transfer operation takes place.

10. A method for controlling data transfer operation across a communication network based on an estimated parameter of the data transfer operation, the method comprising:
    monitoring an operating condition of the communication network;

measuring at least one parameter associated with the monitored operating condition;

converting the measured at least one parameter into at least one time series parameter;

filtering the converted at least one time series parameter using an array of window functions into filtered parameter values;

determining a maximum value of the filtered parameter values as an indicator value of the parameter;

selectively transcoding a data stream based on the indicator value of the parameter; and transferring the transcoded data stream.

11. The method of claim 10, wherein the at least one parameter comprises a throughput.

12. The method of claim 11, wherein the throughput corresponds to an estimated bottleneck bandwidth (eBnBW).

13. The method of claim 12, wherein the estimated bottleneck bandwidth (eBnBW) includes one or more of a congestion window or a round trip time.

14. The method of claim 10, further comprising:

estimating an available bandwidth for transmitting the data stream to at least one client apparatus over the communication network based on the estimated bottleneck bandwidth (eBnBW) and a throughput associated with the succeeding data transfer operations;

varying a bitrate of the data stream based on the estimated available bandwidth; and segmenting and serving a content associated with the data stream according to the varied bitrate.

15. The method of claim 11, further comprising determining at least one target indicator value of the throughput.

16. The method of claim 15, further comprising selecting one of the window functions included in the array of the window functions based on a comparison of the indicator value of the parameter and the at least one target indicator value.

17. The method of claim 16, wherein the at least one target indicator value corresponds to one of a further measured parameter, a throughput of a media segment associated with the data transfer operation, or a rectangular moving average value.

18. The method of claim 10, wherein the indicator value of the parameter is determined based on a congestion state of the communication network through which the data transfer operation takes place.

19. The method of claim 10, wherein the data stream is a media stream selected from any one or any suitable combination of a video stream, an audio stream, a file transfer stream, a messaging stream, or a graphics stream.

20. A computer program product comprising a computer readable storage medium having a computer readable program stored therein, wherein the computer readable program, when executed on a computing device, causes the computing device to: control data transfer operation across a communication network based on an estimated parameter of the data transfer operation, the computer readable program causes the computing device to:

monitor an operating condition of the communication network;

measure at least one parameter associated with the monitored operating condition;

convert the measured at least one parameter into at least one time series parameter;

filter the converted at least one time series parameter using an array of window functions into filtered parameter values;

determine a maximum value of the filtered parameter values as an indicator value of the parameter;

selectively transcode a data stream based on the indicator value of the parameter; and transfer the transcoded data stream.

* * * * *